(12) United States Patent
Mendoza et al.

(10) Patent No.: US 11,941,151 B2
(45) Date of Patent: Mar. 26, 2024

(54) DYNAMIC DATA MASKING FOR IMMUTABLE DATASTORES

(71) Applicant: International Business Machines Corporation, Armonk, NY (US)

(72) Inventors: Alfredo V. Mendoza, Georgetown, TX (US); John Edward Martin, Austin, TX (US); Pradeep P. Mansey, Coral Springs, FL (US); Ana Maria Giordano, Lusby, MD (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 17/305,871

(22) Filed: Jul. 16, 2021

(65) Prior Publication Data
US 2023/0015412 A1 Jan. 19, 2023

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC . G06F 21/6254; G06F 21/602; G06F 21/6245
See application file for complete search history.

(56) References Cited

U.S. PATENT DOCUMENTS

| 4,466,059 | A | * | 8/1984 | Bastian | G06F 12/0804 |
| | | | | | 711/E12.04 |
| 4,500,954 | A | * | 2/1985 | Duke | G06F 12/0866 |
| | | | | | 711/138 |
| 5,881,315 | A | * | 3/1999 | Cohen | G06F 9/542 |
| | | | | | 710/52 |
| 5,999,622 | A | | 12/1999 | Yasukawa et al. | |
| 6,477,585 | B1 | * | 11/2002 | Cohen | G06F 9/542 |
| | | | | | 719/318 |
| 6,643,684 | B1 | * | 11/2003 | Malkin | H04N 1/3333 |
| | | | | | 709/239 |
| 7,395,258 | B2 | * | 7/2008 | Altinel | G06F 16/24552 |
| 7,617,304 | B2 | * | 11/2009 | Devarakonda | H04L 41/0894 |
| | | | | | 707/999.1 |

(Continued)

OTHER PUBLICATIONS

InnovationQ NPL Search (Year: 2023).*

(Continued)

*Primary Examiner* — Samson B Lemma
*Assistant Examiner* — Richard W Cruz-Franqui
(74) *Attorney, Agent, or Firm* — Yee & Associates, P.C.

(57) ABSTRACT

Selectively masking data in messages is provided. A masking expression is retrieved from a schema. The masking expression corresponds to a particular attribute within related messages generated by a producer application and sent to an immutable datastore for consumption by a consumer application of the computer that is registered to receive the messages related to a particular topic from the immutable datastore. A particular attribute value is masked only in those messages received from the immutable datastore that contain the particular attribute value during a time period when the particular attribute value is associated with the masking expression.

19 Claims, 13 Drawing Sheets

(56) References Cited

U.S. PATENT DOCUMENTS

| | | | | |
|---|---|---|---|---|
| 7,631,314 | B2* | 12/2009 | Joseph | G06F 9/547 |
| | | | | 707/999.01 |
| 7,974,942 | B2* | 7/2011 | Pomroy | G06F 21/6245 |
| | | | | 707/610 |
| 8,146,165 | B2* | 3/2012 | Manickam | H04L 63/102 |
| | | | | 726/1 |
| 8,621,649 | B1* | 12/2013 | Van Dijk | H04L 9/40 |
| | | | | 726/1 |
| 8,930,719 | B2 | 1/2015 | Moskowitz | |
| 9,135,315 | B2* | 9/2015 | Barbas | G06F 16/24553 |
| 9,154,479 | B1* | 10/2015 | Sethi | H04L 63/20 |
| 9,171,182 | B2* | 10/2015 | Shukla | G06F 21/6254 |
| 9,886,593 | B2* | 2/2018 | Mushkatblat | G06F 21/6254 |
| 10,339,341 | B2 | 7/2019 | Mushkatblat et al. | |
| 10,528,766 | B2 | 1/2020 | Lee et al. | |
| 10,911,379 | B1* | 2/2021 | Bray | H04L 51/18 |
| 11,093,641 | B1* | 8/2021 | Whalen | G06F 16/906 |
| 11,588,821 | B1* | 2/2023 | Detwiler | H04L 63/0263 |
| 11,622,159 | B2* | 4/2023 | Rengarajan | H04N 21/8355 |
| | | | | 725/25 |
| 2003/0200194 | A1* | 10/2003 | Arnold | G06F 16/24552 |
| 2004/0039886 | A1* | 2/2004 | Christofferson | G06F 12/0888 |
| | | | | 711/139 |
| 2004/0139043 | A1* | 7/2004 | Lei | G06F 21/6227 |
| 2005/0005116 | A1* | 1/2005 | Kasi | G06Q 10/10 |
| | | | | 713/170 |
| 2006/0074897 | A1* | 4/2006 | Fergusson | G06F 16/335 |
| 2007/0234200 | A1* | 10/2007 | Farn | G06Q 10/10 |
| | | | | 715/234 |
| 2008/0270438 | A1* | 10/2008 | Aronson | G16H 10/40 |
| | | | | 714/48 |
| 2009/0086630 | A1* | 4/2009 | Hamada | H04L 63/0272 |
| | | | | 370/253 |
| 2009/0100527 | A1 | 4/2009 | Booth et al. | |
| 2009/0307685 | A1* | 12/2009 | Axnix | G06F 8/60 |
| | | | | 717/174 |
| 2010/0132024 | A1* | 5/2010 | Ben-Natan | G06F 9/545 |
| | | | | 709/224 |
| 2010/0332604 | A1* | 12/2010 | Mishra | H04L 67/55 |
| | | | | 709/206 |
| 2011/0161332 | A1* | 6/2011 | Milman | G06F 21/6245 |
| | | | | 707/754 |
| 2011/0313981 | A1* | 12/2011 | Ben-Natan | G06F 21/6227 |
| | | | | 707/694 |
| 2011/0314278 | A1* | 12/2011 | Taskaya | H04L 9/085 |
| | | | | 713/167 |
| 2012/0151597 | A1* | 6/2012 | Gupta | G06F 21/6254 |
| | | | | 726/26 |
| 2012/0272329 | A1* | 10/2012 | Grammer | G06F 21/6245 |
| | | | | 726/26 |
| 2013/0152158 | A1* | 6/2013 | Yoshihama | G06F 21/6245 |
| | | | | 726/1 |
| 2013/0198605 | A1* | 8/2013 | Nicola | G06F 40/143 |
| | | | | 715/234 |
| 2013/0212689 | A1* | 8/2013 | Ben-Natan | H04L 63/20 |
| | | | | 726/26 |
| 2013/0282697 | A1* | 10/2013 | Barbas | G06F 16/24553 |
| | | | | 707/722 |
| 2014/0123303 | A1* | 5/2014 | Shukla | G06F 21/6254 |
| | | | | 726/26 |
| 2015/0052346 | A1 | 2/2015 | Margolin | |
| 2015/0082449 | A1* | 3/2015 | Mushkatblat | G06F 21/6254 |
| | | | | 726/26 |
| 2015/0088924 | A1* | 3/2015 | Abadi | G06F 16/90335 |
| | | | | 707/769 |
| 2015/0215417 | A1* | 7/2015 | Chetlur | H04L 67/568 |
| | | | | 709/213 |
| 2015/0324607 | A1 | 11/2015 | Mushkatblat et al. | |
| 2016/0085915 | A1* | 3/2016 | Seow | G16Z 99/00 |
| | | | | 705/3 |
| 2016/0127322 | A1* | 5/2016 | Ben-Natan | G06F 21/6254 |
| | | | | 726/26 |
| 2017/0289237 | A1* | 10/2017 | Feltham | G06F 16/1827 |
| 2017/0323119 | A1* | 11/2017 | Harp | G06F 21/6254 |
| 2017/0364450 | A1* | 12/2017 | Struttmann | H04L 9/3297 |
| 2018/0025179 | A1* | 1/2018 | Antonatos | G06F 16/2228 |
| | | | | 726/27 |
| 2018/0152289 | A1* | 5/2018 | Hunt | H04L 9/0637 |
| 2018/0218019 | A1* | 8/2018 | Libow | G06F 16/86 |
| 2018/0218166 | A1* | 8/2018 | Cachin | H04L 9/0891 |
| 2018/0276411 | A1* | 9/2018 | Abdul | G06F 21/6254 |
| 2018/0300498 | A1* | 10/2018 | Burton | H04L 63/102 |
| 2019/0005265 | A1* | 1/2019 | Panchapakesan | G06F 21/6254 |
| 2019/0165804 | A1* | 5/2019 | Amaral | H03M 7/48 |
| 2019/0243911 | A1* | 8/2019 | Kobozev | G16H 30/40 |
| 2019/0286849 | A1* | 9/2019 | Oberhofer | G06F 21/6254 |
| 2019/0356674 | A1* | 11/2019 | Irazabal | H04L 63/102 |
| 2020/0007311 | A1* | 1/2020 | Oberhofer | H04L 63/102 |
| 2020/0019558 | A1* | 1/2020 | Okorafor | G06F 21/6254 |
| 2020/0092088 | A1* | 3/2020 | Novotny | G06F 21/64 |
| 2020/0110812 | A1* | 4/2020 | Kamijoh | H04L 9/3239 |
| 2020/0110902 | A1* | 4/2020 | Zakour | G06F 16/22 |
| 2020/0177684 | A1* | 6/2020 | Yu | G06F 9/546 |
| 2020/0195615 | A1* | 6/2020 | Pikle | G06F 21/6209 |
| 2020/0265159 | A1* | 8/2020 | Schmatz | G06F 21/6245 |
| 2020/0327252 | A1* | 10/2020 | McFall | G06F 21/78 |
| 2020/0336488 | A1* | 10/2020 | Turgeman | G06F 21/602 |
| 2020/0342127 | A1 | 10/2020 | Mullin et al. | |
| 2020/0349194 | A1* | 11/2020 | Kundu | G06F 16/903 |
| 2020/0349288 | A1* | 11/2020 | Jun | G06F 21/6245 |
| 2020/0387635 | A1* | 12/2020 | Lo | G06F 21/6254 |
| 2020/0402625 | A1* | 12/2020 | Aravamudan | G16H 10/60 |
| 2021/0182423 | A1* | 6/2021 | Padmanabhan | G06F 16/24573 |
| 2021/0248268 | A1* | 8/2021 | Ardhanari | G06F 21/53 |
| 2021/0263900 | A1* | 8/2021 | Joyce | G06F 16/2228 |
| 2022/0156704 | A1* | 5/2022 | Shaw | G06Q 10/06395 |
| 2022/0215948 | A1* | 7/2022 | Bardot | G16H 40/67 |
| 2022/0222372 | A1* | 7/2022 | Larson | G06N 20/00 |
| 2022/0358240 | A1* | 11/2022 | Neal | G06F 21/6245 |
| 2023/0015412 | A1* | 1/2023 | Mendoza | G06F 21/6245 |

OTHER PUBLICATIONS

NPL Search History (Year: 2024).*
"Achieving Privacy Compliance for Regulated Data on Kafka and Confluent Platform," Confluent and SecuPi, Confluent, Inc., Copyright 2014-2021, Accessed Jul. 15, 2021, 3 pages. https://www.confluent.io/partner/secupi/.
Stopford, "Handling GDPR with Apache Kafka: How does a log forget?," Dec. 8, 2017, Confluent, Inc., Copyright 2014-2021, Accessed Jul. 15, 2021, 3 pages. https://www.confluent.io/blog/handling-gdpr-log-forget/.
"To Filter data, or to Mask data . . . or both?," Dec. 21, 2014, Axiomatics, Copyright 2021, Accessed Jun. 2, 2021, 5 pages. https://www.axiomatics.com/to-filter-data-or-to-mask-data-or-both/.
Chatterje, "Healthy Architectures—Using CQRS and Event Sourcing for Electronic Medical Records," C4Media Inc., Copyright 2006-2021, Accessed Jul. 15, 2021, 6 pages. https://www.infoq.com/articles/healthcare-emr-ehr/.

* cited by examiner

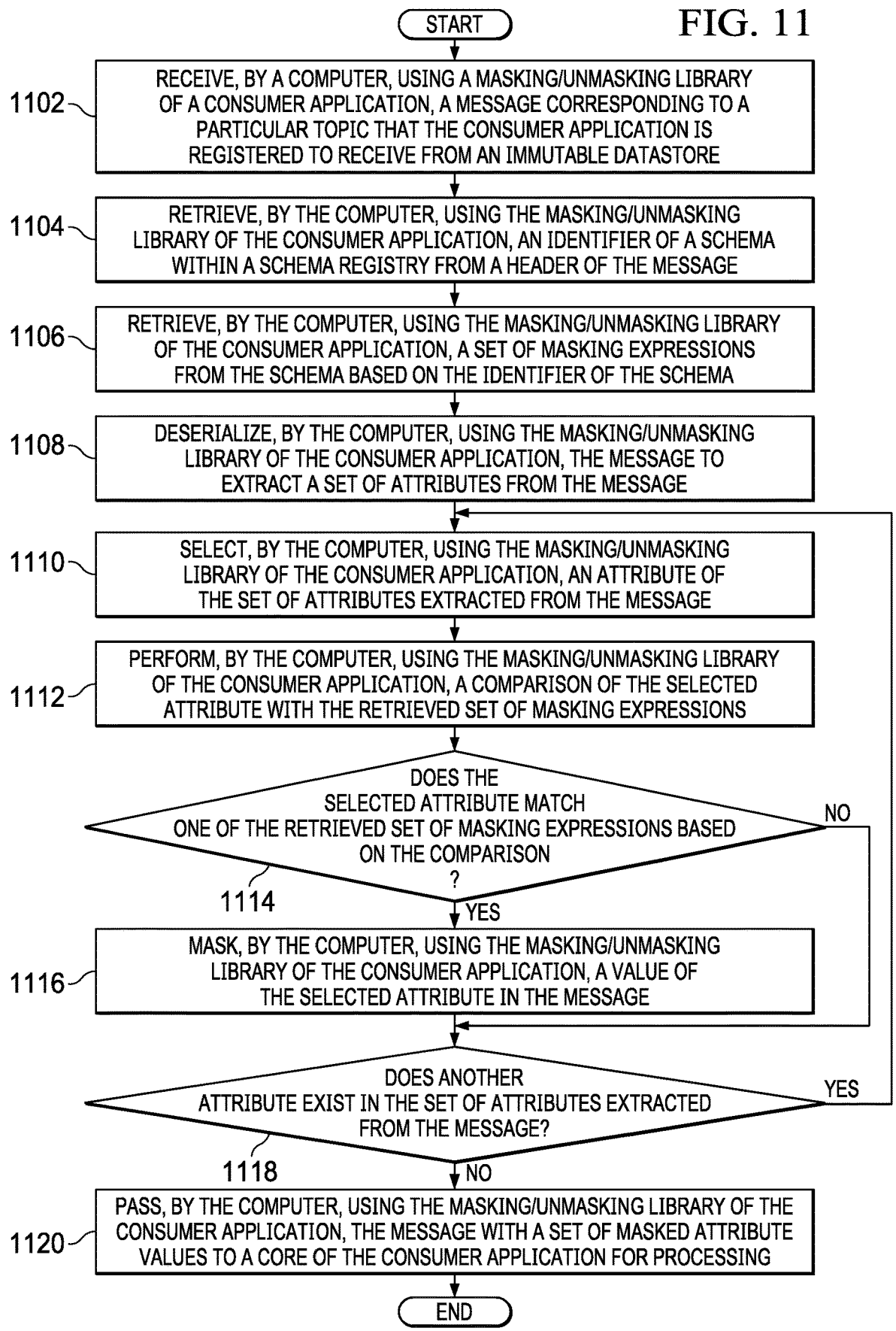

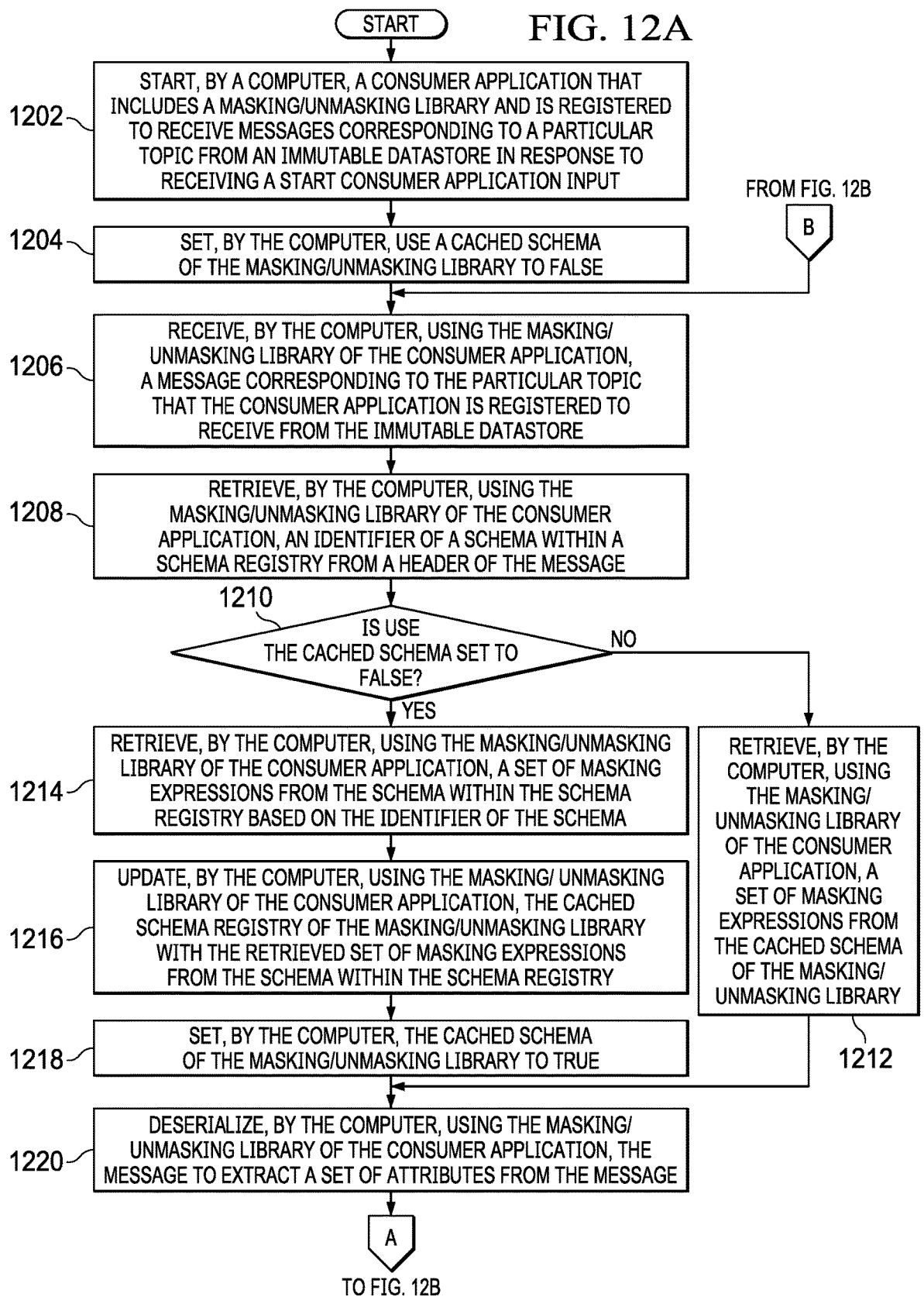

DYNAMIC DATA MASKING FOR IMMUTABLE DATASTORES

BACKGROUND

1. Field

The disclosure relates generally to immutable datastores and more specifically to selectively masking data in messages received from an immutable datastore prior to a subscribing consumer application processing the messages.

2. Description of the Related Art

An immutable datastore, such as, for example, a Kafka® log, stores key-value messages that are received from a plurality of applications called producer applications. Kafka is a registered trademark of The Apache Software Foundation of Wilmington, DE. However, it should be understood that Kafka is intended as an example only. In other words, any type of immutable datastore may be used where the stored messages are non-erasable and non-modifiable. The messages stored in the immutable datastore can correspond to a plurality of different topics. The immutable datastore orders the received messages by topic and timestamp. Other applications called consumer applications, which are registered subscribers to messages corresponding to a particular topic, can read and process those messages related to that particular topic. The immutable datastore can run on a set of one or more servers and the plurality of different topics can be distributed across the set of servers.

Today, billions of data sources continuously generate streams of data records, including streams of events. An event is a digital record of an action that happened and the time that it happened. Typically, an event is an action that drives another action as part of a process. For example, a user placing an online order, selecting a seat on a flight, sending a prescription to a pharmacy, or submitting a patient history form are all examples of events. In addition, an event does not have to involve a person. For example, a network-connected smart thermostat reporting a temperature at a given time is also an event. These streams of data sent to the immutable datastore from producer applications offer opportunities for subscribing consumer applications to read, process, and respond to messages or events corresponding to a particular topic or subject matter in real time.

SUMMARY

According to one illustrative embodiment, a computer-implemented method for selectively masking data in messages is provided. A computer retrieves a masking expression from a schema. The masking expression corresponds to a particular attribute within related messages generated by a producer application and sent to an immutable datastore for consumption by a consumer application of the computer that is registered to receive the messages related to the particular topic from the immutable datastore. The computer masks a particular attribute value only in those messages received from the immutable datastore that contain the particular attribute value during a time period when the particular attribute value is associated with the masking expression. According to other illustrative embodiments, a computer system and computer program product for selectively masking data in messages are provided.

BRIEF DESCRIPTION OF THE DRAWINGS

FIG. 11 is a flowchart illustrating a process for masking values of attributes in messages in accordance with an illustrative embodiment;

FIGS. 12A-12B are a flowchart illustrating a process for masking values of attributes in messages using a cached schema registry in accordance with an illustrative embodiment.

DETAILED DESCRIPTION

Figures 1, 3:
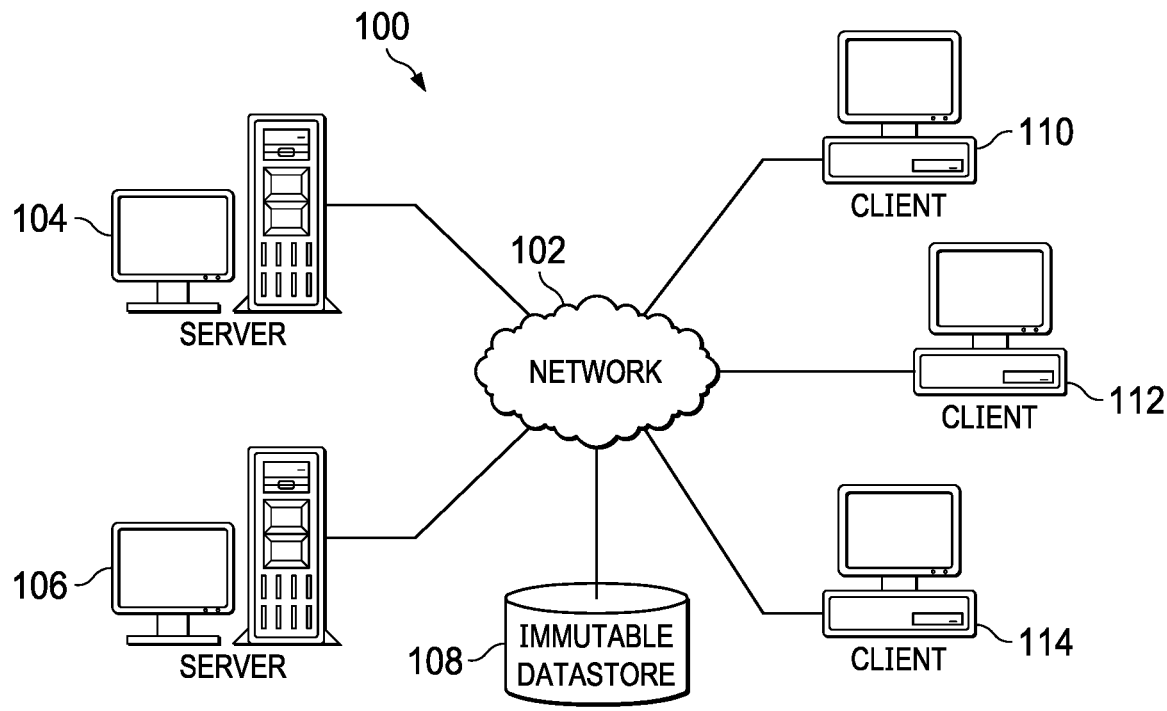
FIG. 1 is a pictorial representation of a network of data processing systems in which illustrative embodiments may be implemented.
FIG. 3 illustrates a specific example of a schema within a schema registry in accordance with an illustrative embodiment.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1, 2, and 4-8, diagrams of data processing environments are provided in which illustrative embodiments may be implemented. It should be appreciated that FIGS. 1, 2, and 4-8 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with immutable datastore 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 may include a producer application that generates a plurality of messages corresponding to a particular topic for a particular industry, such as, for example, financial, banking, governmental, educational, entertainment, and the like. Server 104 sends the generated messages to immutable datastore 108 for storage and forwarding to client devices with consumer applications that are registered subscribers of the generated messages corresponding to that particular topic. Server 106 may include a schema registry of a set of schemas corresponding to sensitive information or other specified information that needs to be masked in messages generated by the producer application of server 104. Server 106 may also include a masking/unmasking notification processor that receives masking events corresponding to the sensitive information or other specified information from server 104 or another external source. A masking event indicates that a particular attribute (e.g., sensitive information or other specified information), which may be contained in a message generated by the producer application of server 104, needs to be masked before being processed by a subscribing consumer application running on a client device. Upon receiving a masking event, server 106 utilizes the masking/unmasking notification processor to update a schema of the schema registry with a masking expression that contains the attribute that needs to be masked.

Client 110, client 112, and client 114 also connect to network 102. Clients 110, 112, and 114 are clients of server 106 and immutable datastore 108. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, smart vehicles, smart appliances, and the like, with wire or wireless communication links to network 102. Users of clients 110, 112, and 114 may utilize clients 110, 112, and 114 to receive and process messages from immutable datastore 108.

The subscribing consumer applications of clients 110, 112, and 114 can include a consumer application masking/unmasking library that masks the specified or sensitive information prior to the specified or sensitive information being processed by the subscribing consumer applications. The consumer application masking/unmasking library retrieves the masking expression from a schema in the schema registry stored in server 106 to determine which attributes contained in messages need to be masked prior to consumption by a respective subscribing consumer application running the consumer application masking/unmasking library.

Immutable datastore 108 is a network storage device capable of storing any type of data in a structured format or an unstructured format. In addition, immutable datastore 108 may represent a plurality of network storage devices. Further, immutable datastore 108 may store a plurality of different messages corresponding to a plurality of different topics for a plurality of different industries, enterprises, companies, businesses, organizations, institutions, agencies, or the like.

In addition, it should be noted that network data processing system 100 may include any number of additional servers, clients, immutable datastores, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 106 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
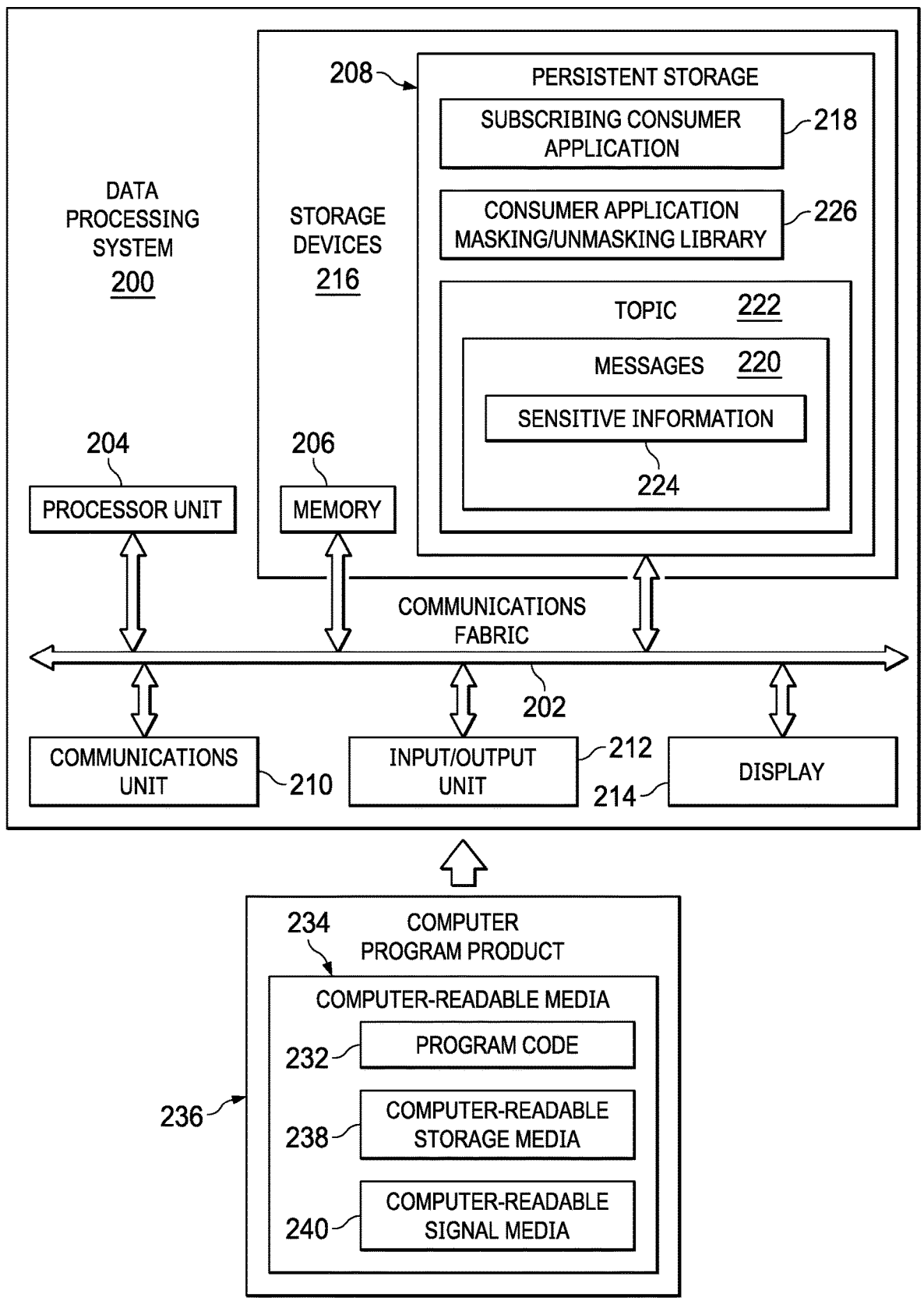
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as client 110 in FIG. 1, in which computer-readable program code or instructions implementing the dynamic data masking processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores subscribing consumer application 218. Subscribing consumer application 218 is registered with an immutable datastore, such as, for example, immutable datastore 108 in FIG. 1, to receive messages 220, which were generated by a producer application of a server, such as, for example, server 104 in FIG. 1, corresponding to topic 222. One or more of messages 220 may contain sensitive information 224 or other specified information, which needs to be masked prior to consumption by subscribing consumer application 218.

Subscribing consumer application 218 runs consumer application masking/unmasking library 226. Consumer application masking/unmasking library 226 controls the process of masking sensitive information 224 contained in messages 220 received from the immutable datastore prior to subscribing consumer application 218 consuming and processing messages 220 to protect sensitive information 224 from being available to subscribing consumer application 218. Consumer application masking/unmasking library 226 utilizes a masking expression, which consumer application masking/unmasking library 226 retrieved from a schema of a schema registry stored on a computer, such as, for example, server 106 in FIG. 1, to determine whether to mask certain information in messages 220. The masking expression includes an attribute value, which is the sensitive or specified information contained in messages 220 that consumer application masking/unmasking library 226 is to mask from subscribing consumer application 218. If a message contains information that matches the attribute value of the masking expression, then consumer application masking/unmasking library 226 masks that information in the message.

As a result, data processing system 200 operates as a special purpose computer system in which consumer application masking/unmasking library 226 in data processing system 200 enables dynamic masking of sensitive information contained in messages from an immutable datastore prior to a subscribing consumer application processing the messages to protect the sensitive information for data security. In particular, consumer application masking/unmasking library 226 transforms data processing system 200 into a special purpose computer system as compared to currently available general computer systems that do not have consumer application masking/unmasking library 226.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 232 is located in a functional form on computer-readable media 234 that is selectively removable and may be loaded onto or transferred to data processing system 200 for running by processor unit 204. Program code 232 and computer-readable media 234 form computer program product 236. In one example, computer-readable media 234 may be computer-readable storage media 238 or computer-readable signal media 240.

In these illustrative examples, computer-readable storage media 238 is a physical or tangible storage device used to store program code 232 rather than a medium that propagates or transmits program code 232. Computer-readable storage media 238 may include, for example, an optical or magnetic disc that is inserted or placed into a drive or other device that is part of persistent storage 208 for transfer onto a storage device, such as a hard drive, that is part of persistent storage 208. Computer-readable storage media 238 also may take the form of a persistent storage, such as a hard drive, a thumb drive, or a flash memory that is connected to data processing system 200.

Alternatively, program code 232 may be transferred to data processing system 200 using computer-readable signal media 240. Computer-readable signal media 240 may be, for example, a propagated data signal containing program code 232. For example, computer-readable signal media 240 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 234" can be singular or plural. For example, program code 232 can be located in computer-readable media 234 in the form of a single storage device or system. In another example, program code 232 can be located in computer-readable media 234 that is distributed in multiple data processing systems. In other words, some instructions in program code 232 can be located in one data processing system while other instructions in program code 232 can be located in one or more other data processing systems. For example, a portion of program code 232 can be located in computer-readable media 234 in a server computer while another portion of program code 232 can be located in computer-readable media 234 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 232.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments dynamically mask specific information sent in messages from an immutable datastore without deleting the information from the immutable datastore. As the term immutable implies, the data in the datastore cannot be modified or deleted the same way as a general purpose datastore.

In addition, the immutable datastore utilizes an event sourcing application where state changes are logged as a time-ordered sequence of records. A wide range of industries, such as, for example, finance, banking, healthcare, government, retail, education, transportation, and the like, utilize event sourcing applications. As an illustrative example, a time series of events for a patient may include all events from the time a healthcare provider accepts a person as a patient to the time the patient is discharged from care. This stored data corresponding to the patient is used in different ways by the healthcare provider that is caring for the patient, such as, for example, insurance, billing, medical history, prescriptions, auditing, regulatory compliance, and the like. In this illustrative example, different applications can consume and process this data corresponding to the patient to accomplish different tasks, such as, insurance, billing, and the like.

The healthcare domain is highly complex from a patient record perspective due to its nonlinear process flows, as well as its myriad of structured and unstructured data elements. As an example, consider a scenario where an adult patient has an acute condition related to a preexisting chronic condition corresponding to a childhood event. A high-level flow of events for this patient may be, for example, patient arrives at healthcare facility, patient details condition to clinician and clinical support staff, and clinician and clinical support staff assess current state of patient and determine eligibility and benefits. The system captures and presents, for example, clinical data regarding the patient, which may include input from multiple sources such as nurses, consulting clinicians, pharmacy, lab, and the like. Associated data may also be related to the current visit and may include previous visits, which may include both the present facility records and previous facilities records, extending back to the patient's childhood. Administrative data regarding the patient may include eligibility and benefits checking as well as prior authorization activities. Additionally, the system may be required to provide decision support analysis associated with pre-existing conditions, drug interactions, allergies, and immunizations among other factors.

Further, the clinician, clinical support staff, and patient devise an initial treatment plan. For this step, the system captures and presents, for example, required procedures, required medications and associated prescriptions, additional instructions and notes, and coordination with other healthcare providers and facilities, such as lab, pharmacy, and the like. In addition to capturing and presenting the treatment plan information, the electronic medical record or electronic heath record will likely work with other systems to enter orders as well as request prescriptions and labs. The treatment plan is successful and visit conclusion procedures are conducted. For this concluding step, the system captures and presents, for example, any remaining visit information, instructions for the course of treatment, supporting information to enable the patient to understand and comply with the course of treatment, and schedule subsequent visits and procedures, as necessary.

The time series of recorded events for this patient above contains personally identifiable information (PII) and protected health information (PHI) corresponding to that patient and may also contain PII corresponding to healthcare providers that interacted with the patient. This sensitive information is accessible as intended until an incident or reason occurs that a healthcare provider is required to mask specific portions of the patient's information from anyone except authorized personnel. An incident that can occur requiring a healthcare provider to mask sensitive information of the patient may be, for example, the healthcare provider being involved with newsworthy activities, such as clinical research trials for a promising new medication. A news reporter, for example, may suddenly be interested in patients treated by that particular healthcare provider and try to obtain that patient information. To prevent patient information corresponding to that particular healthcare provider from being exposed to consuming applications, a method is needed for temporarily or permanently masking the sensitive patient information in the records without removing the information. A reason to mask the sensitive patient information stored in an immutable datastore is when regulations mandate, for example, that patient records are not to be made publicly available if the patient designates that the records are not to be made available.

Currently, messages containing sensitive information (e.g., PII, PHI, or the like) are encrypted before sending the messages to the immutable datastore. Subscribing consumer applications of these messages are provided decryption keys in order to decrypt and read the messages. When these messages contain sensitive information that is not to be made available, the decryption key is inaccessible to the subscribing consumer applications, which results in the subscribing consumer applications not being able to read the messages containing the sensitive information. However, encrypting and decrypting messages is resource intensive and can add performance overhead to the system.

Illustrative embodiments can mask data in a production environment in real time or near real time using a schema registry of sensitive information, which contains a set of schemas with masking expressions, without deleting any of the data in the immutable datastore or increasing system overhead. For example, a producer application generates messages corresponding to a particular topic and sends those messages to the immutable datastore. A set of subscribing consumer applications consume and process these messages corresponding to that particular topic. It should be noted that the producer and consumer applications have agreed to use a schema to form a contract of the format and attributes of the messages. In other words, the schema enables a trust relationship between the producer and consumer applications.

Illustrative embodiments mask sensitive information (e.g., PII, PHI, or similar type of sensitive or specified information) based on an identified attribute value contained in a masking expression of the schema. Illustrative embodiments store messages as the messages are received from producer applications without masking any of the information. In other words, illustrative embodiments perform masking of the sensitive information prior to a subscribing consumer application receiving messages containing the sensitive information. Illustrative embodiments retrieve messages corresponding to a specific topic from the immutable datastore and examine the schema to determine whether an attribute value in the messages matches a masking expression in the schema. If a match exists, then illustrative embodiments mask the attribute value in the messages that matches the masking expression in the schema. As a result, a consuming application cannot read the masked attribute value (e.g., sensitive or specified information) contained in the messages. If a match does not exist, then illustrative embodiments process the messages as normal and send the messages to the subscribing consumer applications without change (e.g., without any masking of attribute values in the messages).

When illustrative embodiments receive a masking event, illustrative embodiments modify the current schema so that a masking/unmasking library of the subscribing consumer application can identify the attribute (e.g., sensitive or specified information) corresponding to the masking event to determine which portions, if any, of the received messages need to be masked before the messages reach the core of the subscribing consumer application. Illustrative embodiments may optionally utilize a producer application library of a producer application to encrypt messages prior to sending the messages to the immutable datastore when masking is required for those messages.

Thus, illustrative embodiments enable masking of sensitive or specified information based on an actual attribute value rather than an associated attribute key. Masking sensitive information based on an actual attribute value rather than an associated attribute key enables illustrative embodiments to target specific sensitive information in a more granular way. Therefore, illustrative embodiments ensure that sensitive information that needs to be masked is not available to any subscribing consumer applications. Hence, illustrative embodiments provide increased data security for sensitive information contained in messages.

Thus, illustrative embodiments provide one or more technical solutions that overcome a technical problem with protecting sensitive information contained in messages sent via a network to subscribing consumer applications. As a result, these one or more technical solutions provide a technical effect and practical application in the field of data security.

With reference now to FIG. 3, a specific example of a schema within a schema registry is illustrated in accordance with an illustrative embodiment. In this specific example, schema 300 is a JavaScript Object Notation (JSON) document. However, it should be noted that JSON is intended as an example only and that illustrative embodiments may utilize any type of notation or script for schema 300.

Schema 300 includes masking expression 302. A consumer application masking/unmasking library, such as, for example, consumer application masking/unmasking library 226 in FIG. 2, utilizes masking expression 302 to mask sensitive information, such as attribute value 304, contained in messages received from an immutable datastore, such as, for example, immutable datastore 108 in FIG. 1, prior to a subscribing consumer application, such as, for example, subscribing consumer application 218 in FIG. 2, processing the messages to protect the sensitive information from exposure. In this specific example, attribute value 304 is "Dr. John Doe". In other words, the attribute is doctor name and the actual value of the attribute in this specific example is "Dr. John Doe", which the consumer application masking/unmasking library will use as an indication to mask an entire message or mask specific values within the message containing attribute value 304. However, attribute value 304 is intended as an example only and not as a limitation on illustrative embodiments. In other words, attribute value 304 may be any specified attribute value within the schema 300.

Figure 4:
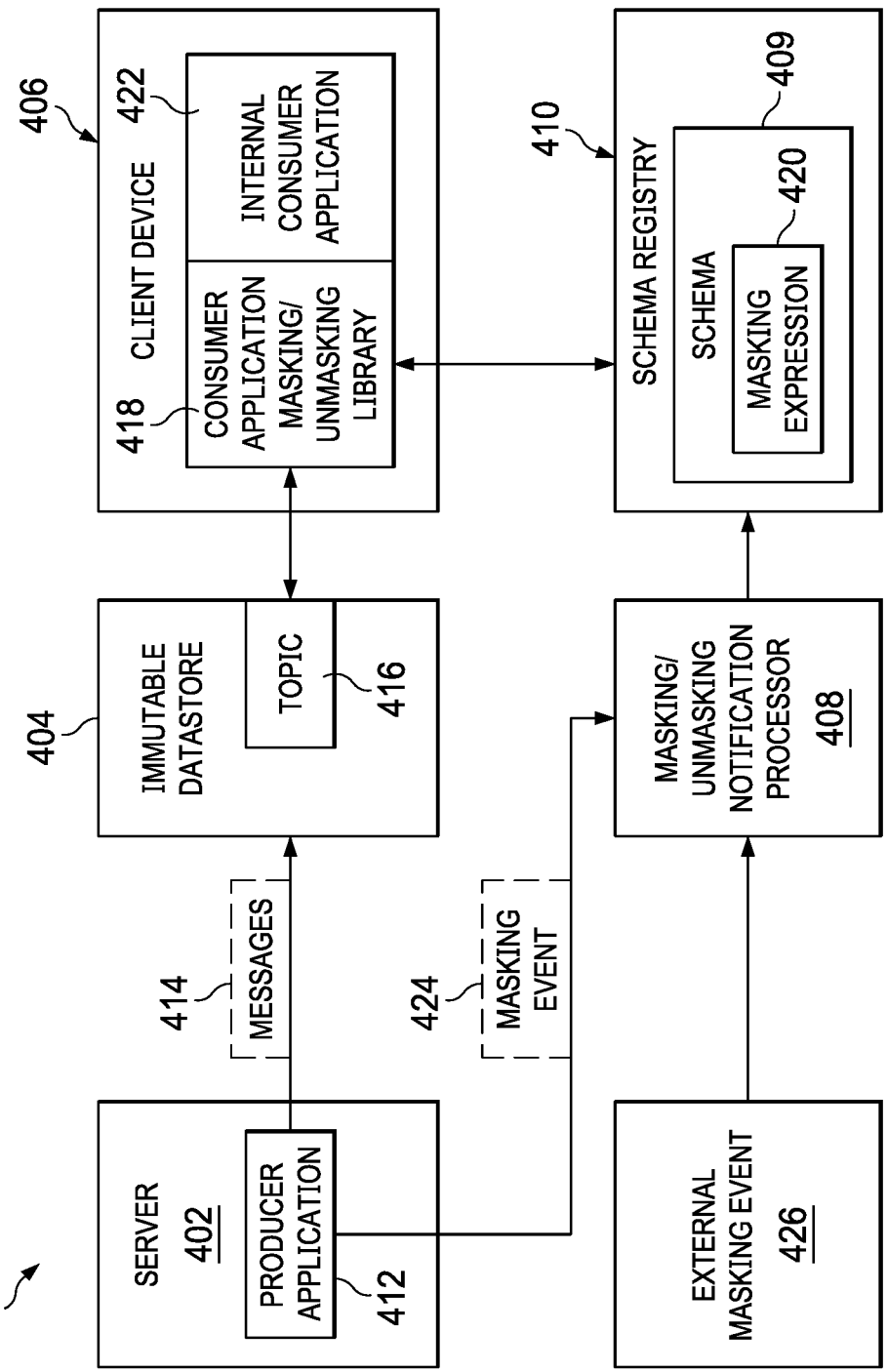
FIG. 4 is a diagram illustrating an example of a dynamic data masking system with internal consumer application in accordance with an illustrative embodiment.

With reference now to FIG. 4, a diagram illustrating an example of a dynamic data masking system with internal consumer application is depicted in accordance with an illustrative embodiment. Dynamic data masking system with internal consumer application 400 may be implemented in a network of data processing systems, such as network data processing system 100 in FIG. 1. Dynamic data masking system with internal consumer application 400 is a system of hardware and software components for selectively masking data in messages.

In this example, dynamic data masking system with internal consumer application 400 includes server 402, immutable datastore 404, client device 406, masking/unmasking notification processor 408, and schema registry 410. Server 402, immutable datastore 404, client device 406, may be, for example, server 104, immutable datastore 108, and client 110 in FIG. 1. Masking/unmasking notification processor 408 and schema registry 410 may be implemented in a computer, such as, for example, server 106 in FIG. 1.

Server 402 includes producer application 412, which generates messages 414 corresponding to topic 416. Topic 416 may be, for example, any name that signifies where a consumer will be consuming messages from. Producer application 412 sends messages 414 corresponding to topic 416 to immutable datastore 404.

When specific information (e.g., sensitive information) contained in messages 414 generated by producer application 412 corresponding to topic 416 needs to be masked in messages 414, subscribing internal consumer application 422 receives masked information in messages 414 to protect the sensitive information contained in messages 414. When masking/unmasking notification processor 408 receives a masking event, such as masking event 424, from producer application 412 or receives an external masking event, such as external masking event 426, from an external source, masking/unmasking notification processor 408 modifies schema 409 of schema registry 410 that is used by all subscribing consumer applications listening for messages corresponding to topic 416. The modification consists of masking/unmasking notification processor 408 adding masking expression 420, which corresponds to a specific attribute value (e.g., attribute value 304 in FIG. 3), to schema 409 in schema registry 410. This modification triggers consumer application masking/unmasking library 418, which subscribing internal consumer application 422 is running, to mask the specific information contained in one or more of messages 414 corresponding to topic 416 that matches the attribute value specified in masking expression 420 of schema 409.

Consumer application masking/unmasking library 418 masks the specific attribute value contained in any of messages 414 when consumer application masking/unmasking library 418 determines that the specific attribute value contained in one or more of messages 414 matches the attribute value of masking expression 420 in schema 409 in schema registry 410. Subscribing internal consumer application 422 may be, for example, an internal patient history intake application, which is a trusted internal consumer application. A trusted consumer application is a consumer application that always runs consumer application masking/unmasking library 418. If a matching masking expression exists in schema 409 within the schema registry 410 for the specific attribute value (e.g., sensitive information) contained in messages 414, then consumer application masking/unmasking library 418 is triggered to mask that specific attribute value in messages 414 before messages 414 reach the core of subscribing internal consumer application 422.

Figure 5:
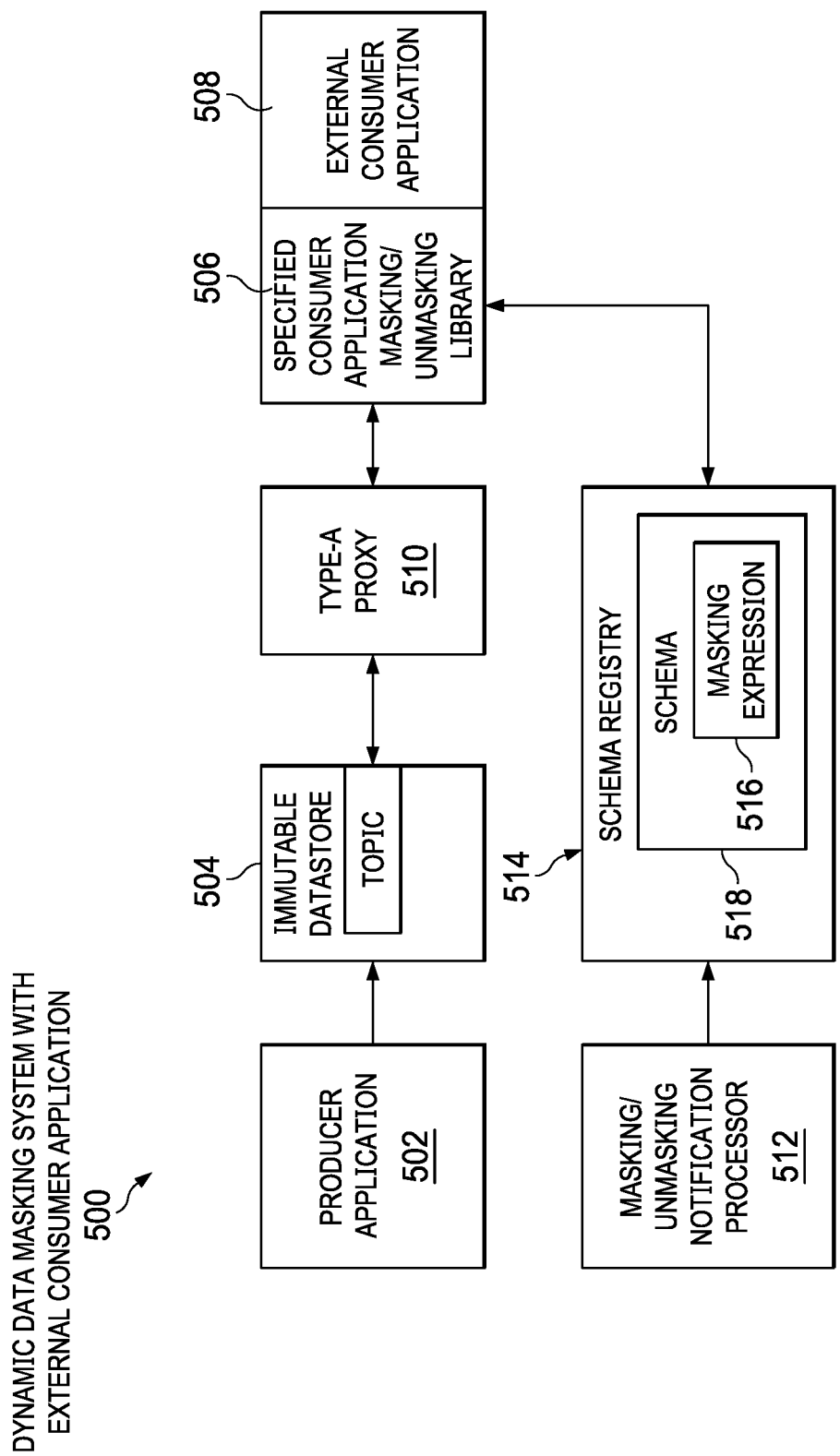
FIG. 5 is a diagram illustrating an example of a dynamic data masking system with external consumer application in accordance with an illustrative embodiment.

With reference now to FIG. 5, a diagram illustrating an example of a dynamic data masking system with external consumer application is shown in accordance with an illustrative embodiment. Dynamic data masking system with external consumer application 500 may be implemented in a network of data processing systems, such as network data processing system 100 in FIG. 1. Dynamic data masking system with external consumer application 500 is a system of hardware and software components for selectively masking data in messages.

In this example, dynamic data masking system with external consumer application 500 includes producer application 502, immutable datastore 504, specified consumer application masking/unmasking library 506, external consumer application 508, type-A proxy 510, masking/unmasking notification processor 512, and schema registry 514. Producer application 502, immutable datastore 504, masking/unmasking notification processor 512, and schema registry 514 may be, for example, producer application 412, immutable datastore 404, masking/unmasking notification processor 408, and schema registry 410 in FIG. 4.

In this example, external consumer application 508 is registered to receive messages generated by producer application 502 corresponding to a particular topic from immutable datastore 504 and may be, for example, an external pharmacy prescription intake application. In this example, external consumer application 508 is a non-trusted external consumer application that is registered to consume messages corresponding to the particular topic. External consumer application runs specified consumer application masking/unmasking library 506, which verifies itself with type-A proxy 510 positioned between immutable datastore 504 and specified consumer application masking/unmasking library 506. Type-A proxy 510 verifies that external consumer application 508 is running specified consumer application masking/unmasking library 506 at connection time. If type-A proxy 510 verifies that external consumer application 508 is running specified consumer application masking/unmasking library 506 at connection time, then type-A proxy 510 acts as a pass-through for messages from immutable datastore 504 to specified consumer application masking/unmasking library 506 after verification. Once verified, specified consumer application masking/unmasking library 506 of external consumer application 508 performs masking of sensitive or specified information contained in messages from immutable datastore 504 using masking expression 516 of schema 518 within schema registry 514 similar to the example of FIG. 4 above.

Figure 6:
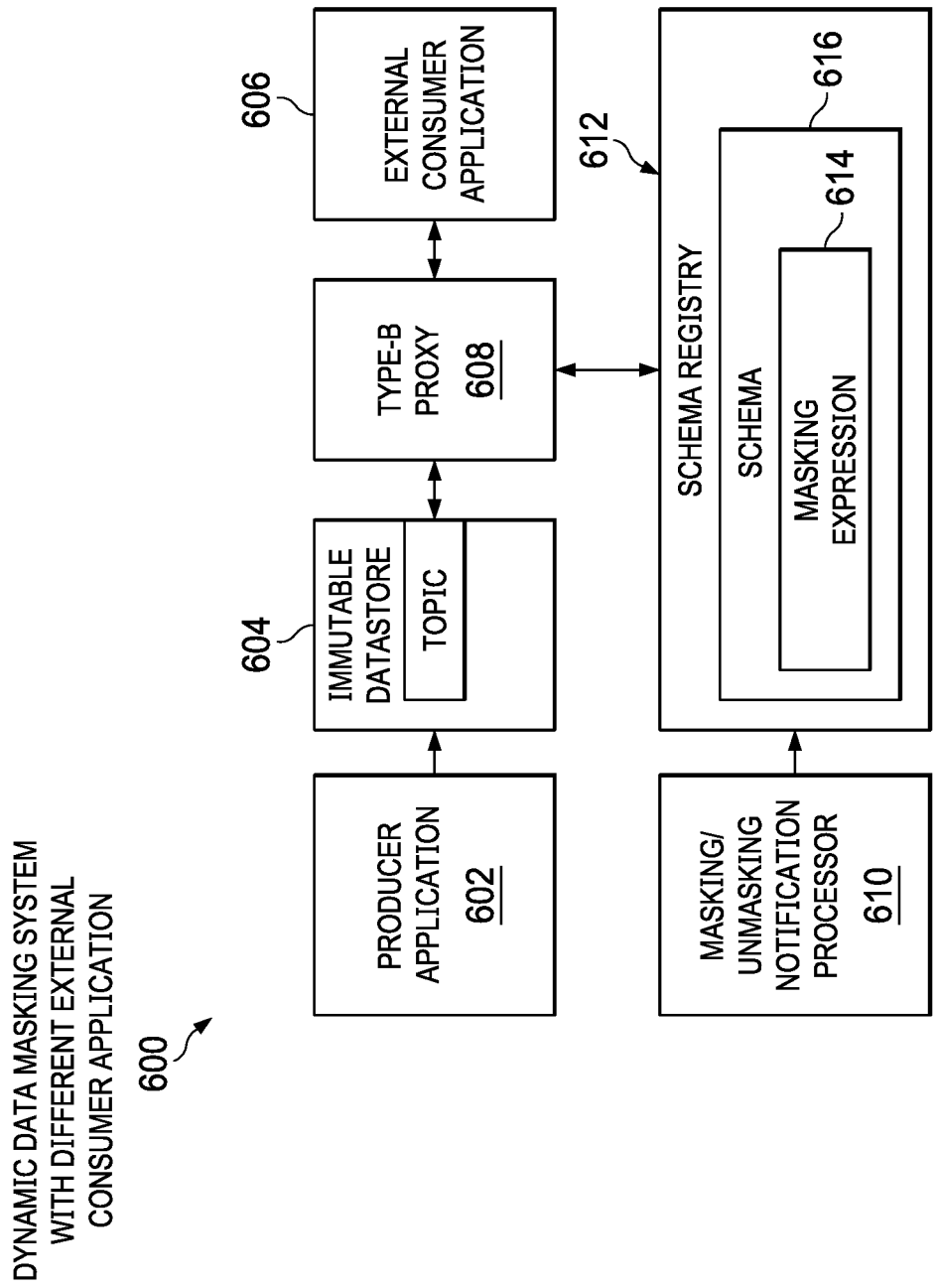
FIG. 6 is a diagram illustrating an example of a dynamic data masking system with different external consumer application in accordance with an illustrative embodiment.

With reference now to FIG. 6, a diagram illustrating an example of a dynamic data masking system with different external consumer application is shown in accordance with an illustrative embodiment. Dynamic data masking system with different external consumer application 600 may be implemented in a network of data processing systems, such as network data processing system 100 in FIG. 1. Dynamic data masking system with different external consumer application 600 is a system of hardware and software components for selectively masking data in messages.

In this example, dynamic data masking system with different external consumer application 600 includes producer application 602, immutable datastore 604, external consumer application 606, type-B proxy 608, masking/unmasking notification processor 610, and schema registry 612. In this example, external consumer application 606 is a non-trusted external consumer application that is registered to receive messages generated by producer application 602 corresponding to a particular topic from immutable datastore 604 and may be, for example, an external lab order intake application. However, external consumer application 606 does not run the specified consumer application masking/unmasking library, such as, for example, specified consumer application masking/unmasking library 506 in FIG. 5.

When a non-trusted external consumer application does not run the specified consumer application masking/unmasking library, the non-trusted external consumer application connects to a type-B proxy, such as type-B proxy 608. Type-B proxy 608 acts as the specified consumer application masking/unmasking library such that type-B proxy 608 connects to schema registry 612 to determine whether messages from immutable datastore 604 contain specific attribute values (e.g., sensitive information) that match the attribute value of masking expression 614 of schema 616 in schema registry 612. If type-B proxy 608 determines that messages contain specific attribute values that match the attribute value of masking expression 614 of schema 616 in schema registry 612, then type-B proxy 608 masks the specific attribute values (e.g., sensitive information) contained in the messages and forwards the messages with the masked sensitive information to external consumer application 606 for processing.

Figure 7:
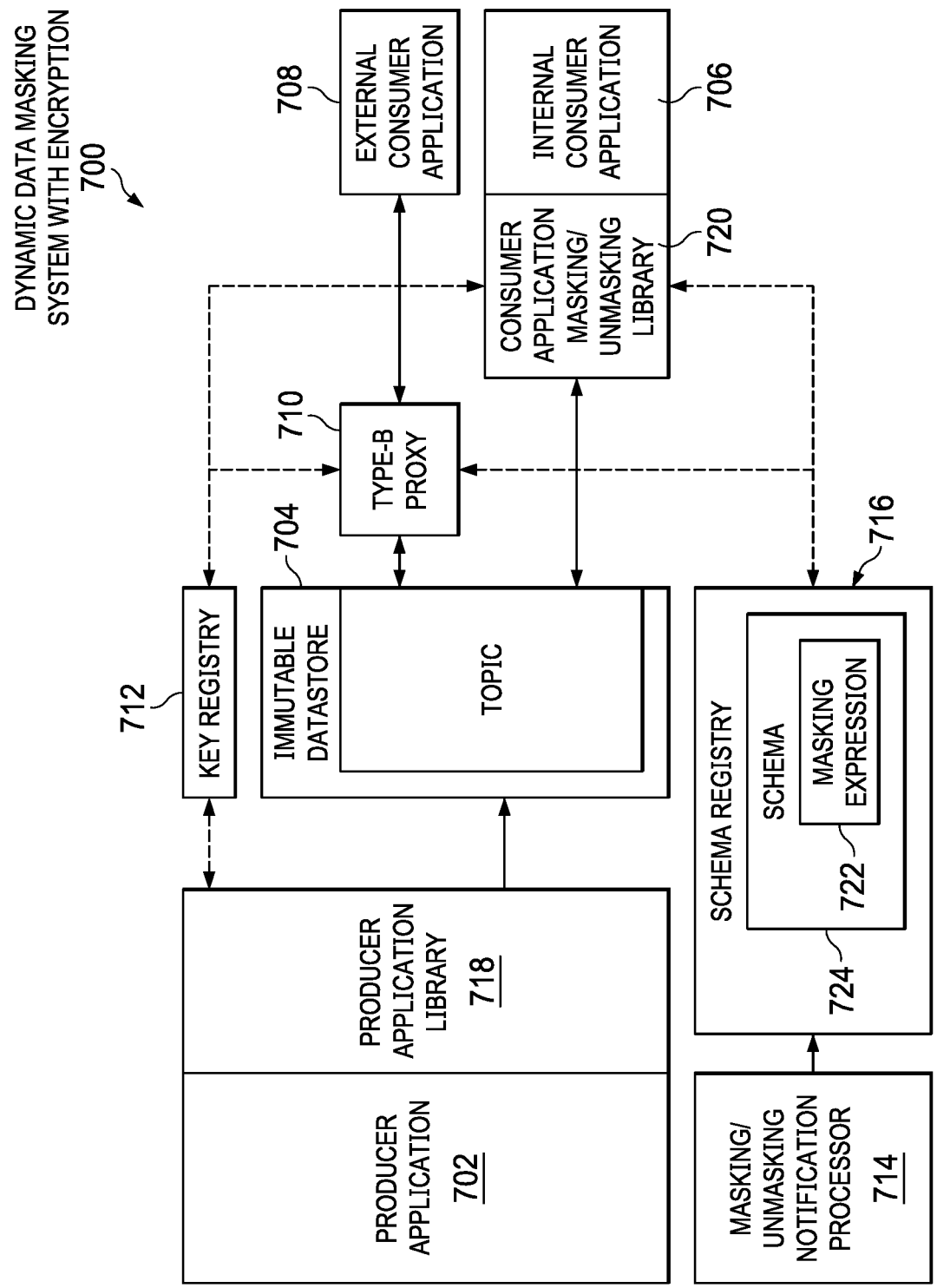
FIG. 7 is a diagram illustrating an example of a dynamic data masking system with encryption in accordance with an illustrative embodiment.

With reference now to FIG. 7, a diagram illustrating an example of a dynamic data masking system with encryption is shown in accordance with an illustrative embodiment. Dynamic data masking system with encryption 700 may be implemented in a network of data processing systems, such as network data processing system 100 in FIG. 1. Dynamic data masking system with encryption 700 is a system of hardware and software components for selectively masking data in messages.

In this example, dynamic data masking system with encryption 700 includes producer application 702, immutable datastore 704, subscribing internal consumer application 706, registered external consumer application 708, type-B proxy 710, key registry 712, masking/unmasking notification processor 714, and schema registry 716. In this example, it should be noted that encryption of messages generated by producer application 702 is optional. For example, if a need exists to encrypt messages containing sensitive information, then producer application 702 utilizes producer application library 718 to encrypt each message containing the sensitive information. The cryptographic keys to encrypt and decrypt the messages are available via key registry 712.

In this example, consumer application masking/unmasking library 720 is able to decrypt each message containing the sensitive information as each message is received by obtaining the cryptographic keys from key registry 712. After decrypting the messages, consumer application masking/unmasking library 720 masks the sensitive information matching the attribute value of masking expression 722 of schema 724 within schema registry 716 and then sends the messages with the masked sensitive information to subscribing internal consumer application 706 for processing. Similarly, type-B proxy 710 is able to decrypt each message containing the sensitive information as each message is received by obtaining the cryptographic keys from key registry 712. After decrypting the messages, type-B proxy 710 masks the sensitive information matching the attribute value of masking expression 722 of schema 724 within schema registry 716 and then forwards the messages with the masked sensitive information to registered external consumer application 708 for processing.

Figure 8:
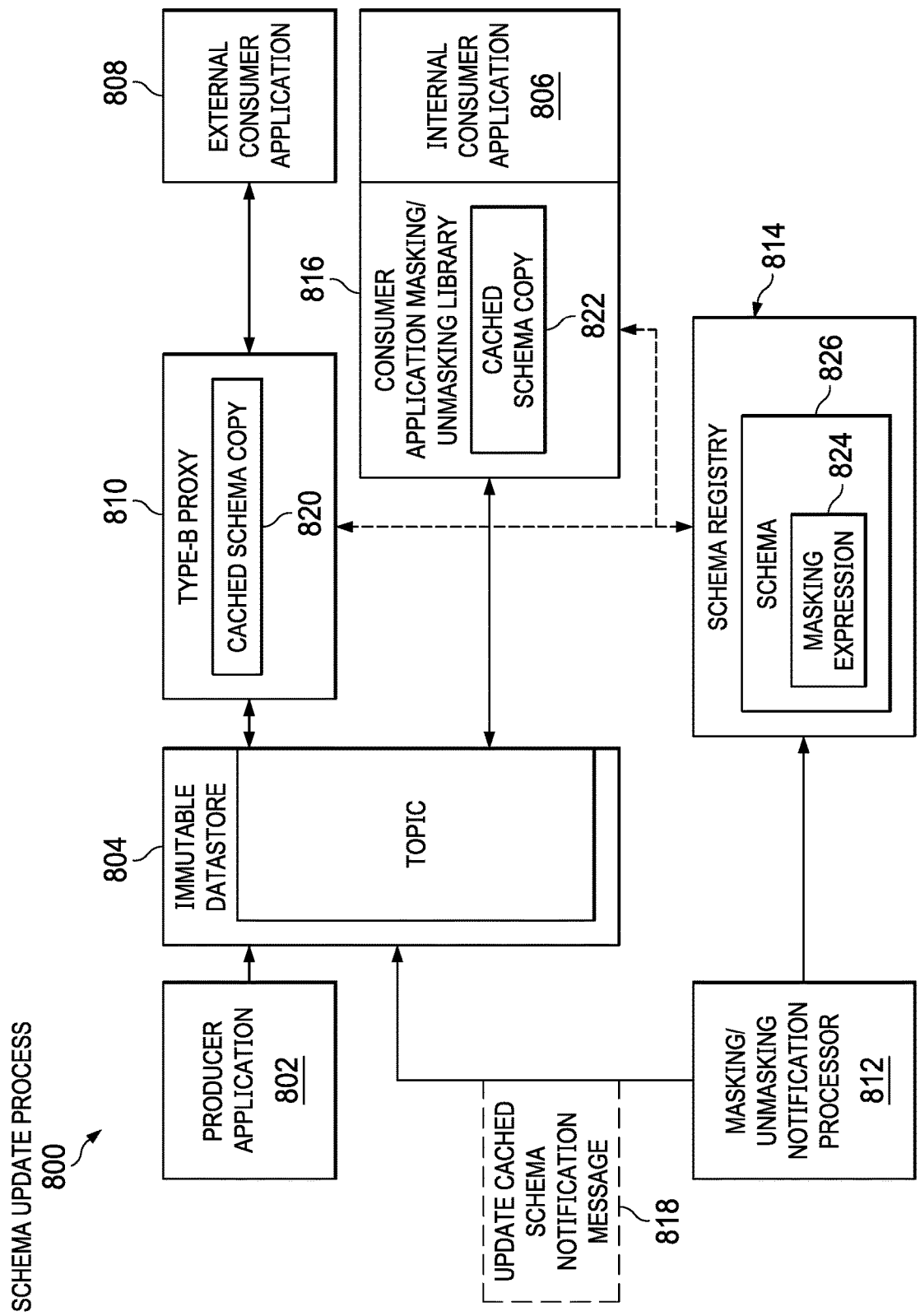
FIG. 8 is a diagram illustrating an example of a schema update process in accordance with an illustrative embodiment.

With reference now to FIG. 8, a diagram illustrating an example of a schema update process is shown in accordance with an illustrative embodiment. Schema update process 800 may be implemented in a network of data processing systems, such as network data processing system 100 in FIG. 1. In this example, schema update process 800 includes producer application 802, immutable datastore 804, subscribing internal consumer application 806, registered external consumer application 808, type-B proxy 810, masking/unmasking notification processor 812, and schema registry 814.

As shown in the examples of FIGS. 4-7 above, the consumer application masking/unmasking libraries and the type-B proxies are responsible for masking sensitive information in messages prior to internal and external consumer applications processing the messages. In this example, both consumer application masking/unmasking library 816 and type-B proxy 810 include a cached copy of schema 826, such as cached schema copy 822 and cached schema copy 820, respectively, after consumer application masking/unmasking library 816 and type-B proxy 810 read masking expression 824 of schema 826 within schema registry 814.

It should be noted that schema 826 does not contain any masking expression initially. When a masking event, such as, for example, masking event 424 in FIG. 4, occurs, masking/unmasking notification processor 812 updates schema 826 to include a masking expression, such as masking expression 824, which corresponds to the masking event. As a result of the update to schema 826 within schema registry 814, consumer application masking/unmasking library 816 and type-B proxy 810 need to update their respective cached copy of schema 826 (e.g., cached schema copy 822 and cached schema copy 820, respectively).

To update cached schema copy 822 and cached schema copy 820, consumer application masking/unmasking library 816 and type-B proxy 810 poll schema registry 814 on a predefined time interval basis. Consumer application masking/unmasking library 816 and type-B proxy 810 can perform this polling of schema registry 814 on the predefined time interval basis using a timer set to a relatively small interval, such as, for example, 1 second, or set to a relatively large interval, such as, for example, 10 seconds. Setting a relatively small interval may affect performance of consumer application masking/unmasking library 816 and type-B proxy 810 by having to poll schema registry 814 frequently. Setting a relatively large interval can cause specified sensitive information contained in messages to pass through consumer application masking/unmasking library 816 and type-B proxy 810 to the consuming applications until the cached copy of schema 826 is updated in consumer application masking/unmasking library 816 and type-B proxy 810.

To mitigate the effect of a long delay timer, masking/unmasking notification processor 812 can send update cached schema notification message 818 to immutable datastore 804 after masking/unmasking notification processor 812 updates schema 826 within schema registry 814 with a new masking expression, such as masking expression 824, corresponding to the masking event. Immutable datastore 804 sends update cached schema notification message 818 to consumer application masking/unmasking library 816 and type-B proxy 810. Update cached schema notification message 818 triggers consumer application masking/unmasking library 816 and type-B proxy 810 to update cached schema copy 822 and cached schema copy 820, respectively, with the changes made to schema 826. As a result, consumer application masking/unmasking library 816 and type-B proxy 810 can update their respective cached copy of schema 826 even before the timer expires. Thus, update cached schema notification message 818 provides an immediate trigger to update cached schema copy 822 and cached schema copy 820 prior to expiration of the timer.

Figure 9:
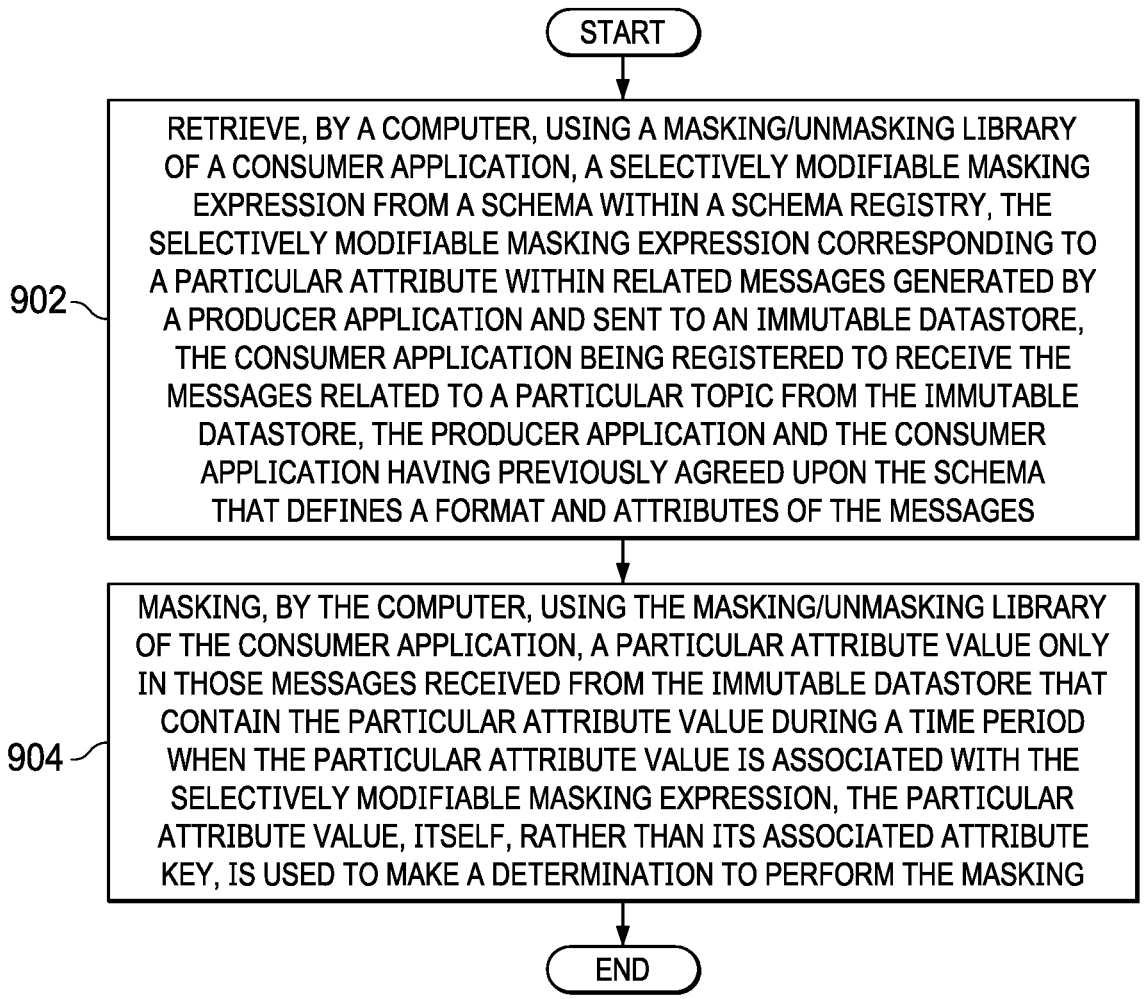
FIG. 9 is a flowchart illustrating a process for selectively masking data in messages in accordance with an illustrative embodiment.

With reference now to FIG. 9, a flowchart illustrating a process for selectively masking data in messages is shown in accordance with an illustrative embodiment. The process shown in FIG. 9 may be implemented in a computer, such as, for example, client 110 in FIG. 1 or data processing system 200 in FIG. 2. For example, the process shown in FIG. 9 may be implemented in consumer application masking/unmasking library 226 in FIG. 2.

The process begins when the computer, using a masking/unmasking library of a consumer application, retrieves a selectively modifiable masking expression from a schema within a schema registry (step 902). The selectively modifiable masking expression corresponds to a particular attribute within related messages generated by a producer application and sent to an immutable datastore. Selectively modifiable means that a masking/unmasking notification processor can modify the masking expression in real time or near real time in accordance with a received masking event indicating that a particular attribute in messages needs to be masked. The consumer application is registered to receive the messages related to the particular topic from the immutable datastore. In addition, the producer application and the consumer application had previously agreed upon the schema that defines a format and attributes of the messages.

The computer, using the masking/unmasking library of the consumer application, masks a particular attribute value only in those messages received from the immutable datastore that contain the particular attribute value during a time period when the particular attribute value is associated with the selectively modifiable masking expression (step 904). The particular attribute value, itself, rather than its associated attribute key, is used to make a determination to perform the masking.

Figure 10:
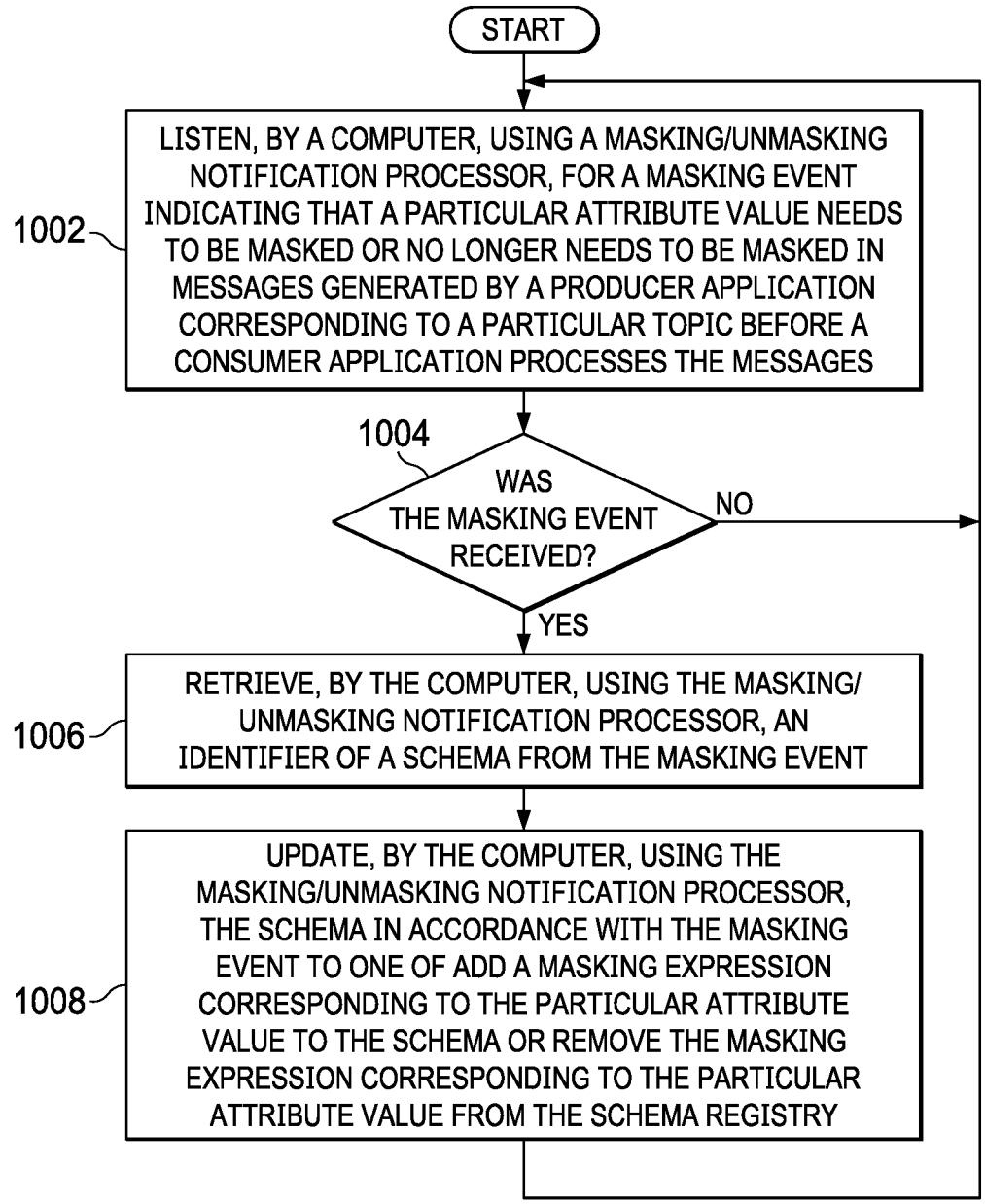
FIG. 10 is a flowchart illustrating a process for updating a schema registry in accordance with an illustrative embodiment.

With reference now to FIG. 10, a flowchart illustrating a process for updating a schema registry is shown in accordance with an illustrative embodiment. The process shown in FIG. 10 may be implemented in a masking/unmasking notification processor, such as, for example, masking/unmasking notification processor 408 in FIG. 4.

The process begins when a computer, using the masking/unmasking notification processor, listens for a masking event indicating that a particular attribute value needs to be masked or no longer needs to be masked in messages generated by a producer application corresponding to a particular consumer application processes the messages (step 1002). The masking event may be a masking or unmasking event. The computer, using the masking/unmasking notification processor, makes a determination as to whether a masking event was received (step 1004).

If the computer, using the masking/unmasking notification processor, determines that a masking event was not received, no output of step 1004, then the process returns to step 1002 where the computer, using the masking/unmasking notification processor, continues to listen for a masking event. If the computer, using the masking/unmasking notification processor, determines that a masking event was received, yes output of step 1004, then the computer, using the masking/unmasking notification processor, retrieves an identifier of a schema from the masking event (step 1006). In addition, the computer, using the masking/unmasking notification processor, updates the schema in accordance with the masking event to one of add a masking expression corresponding to the particular attribute value to the schema or remove the masking expression corresponding to the particular attribute value from the schema (step 1008). Thereafter, the process returns to step 1002 where the computer, using the masking/unmasking notification processor, continues to listen for a masking event.

With reference now to FIG. 11, a flowchart illustrating a process for masking values of attributes in messages is shown in accordance with an illustrative embodiment. The process shown in FIG. 11 may be implemented in a computer, such as, for example, client 110 in FIG. 1 or data processing system 200 in FIG. 2. For example, the process shown in FIG. 11 may be implemented in consumer application masking/unmasking library 226 in FIG. 2.

The process begins when the computer, using the masking/unmasking library of a consumer application, receives a message corresponding to a particular topic that the consumer application is registered to receive from an immutable datastore (step 1102). The computer, using the masking/unmasking library of the consumer application, retrieves an identifier of a schema within a schema registry from a header of the message (step 1104). In addition, the computer, using the masking/unmasking library of the consumer application, retrieves a set of masking expressions from the schema based on the identifier of the schema (step 1106).

Further, the computer, using the masking/unmasking library of the consumer application, deserializes the message to extract a set of attributes from the message (step 1108). Afterward, the computer, using the masking/unmasking library of the consumer application, selects an attribute of the set of attributes extracted from the message (step 1110). Furthermore, the computer, using the masking/unmasking library of the consumer application, performs a comparison of the selected attribute with the retrieved set of masking expressions (step 1112).

The computer, using the masking/unmasking library of the consumer application, makes a determination as to whether the selected attribute matches one of the retrieved set of masking expressions based on the comparison (step 1114). If the computer, using the masking/unmasking library of the consumer application, determines that the selected attribute does not match one of the retrieved set of masking expressions based on the comparison, no output of step 1114, then the process proceeds to step 1118. If the computer, using the masking/unmasking library of the consumer application, determines that the selected attribute does match one of the retrieved set of masking expressions based on the comparison, yes output of step 1114, then the computer, using the masking/unmasking library of the consumer application, masks a value of the selected attribute in the message (step 1116).

Moreover, the computer, using the masking/unmasking library of the consumer application, makes a determination as to whether another attribute exists in the set of attributes extracted from the message (step 1118). If the computer, using the masking/unmasking library of the consumer application, determines that another attribute does exist in the set of attributes extracted from the message, yes output of step 1118, then the process returns to step 1110 where the computer, using the masking/unmasking library of the consumer application, selects another attribute in the set of attributes. If the computer, using the masking/unmasking library of the consumer application, determines that another attribute does not exist in the set of attributes extracted from the message, no output of step 1118, then the computer, using the masking/unmasking library of the consumer application, passes the message with a set of masked attribute values to a core of the consumer application for processing (step 1120). Thereafter, the process terminates.

Figure 12B:
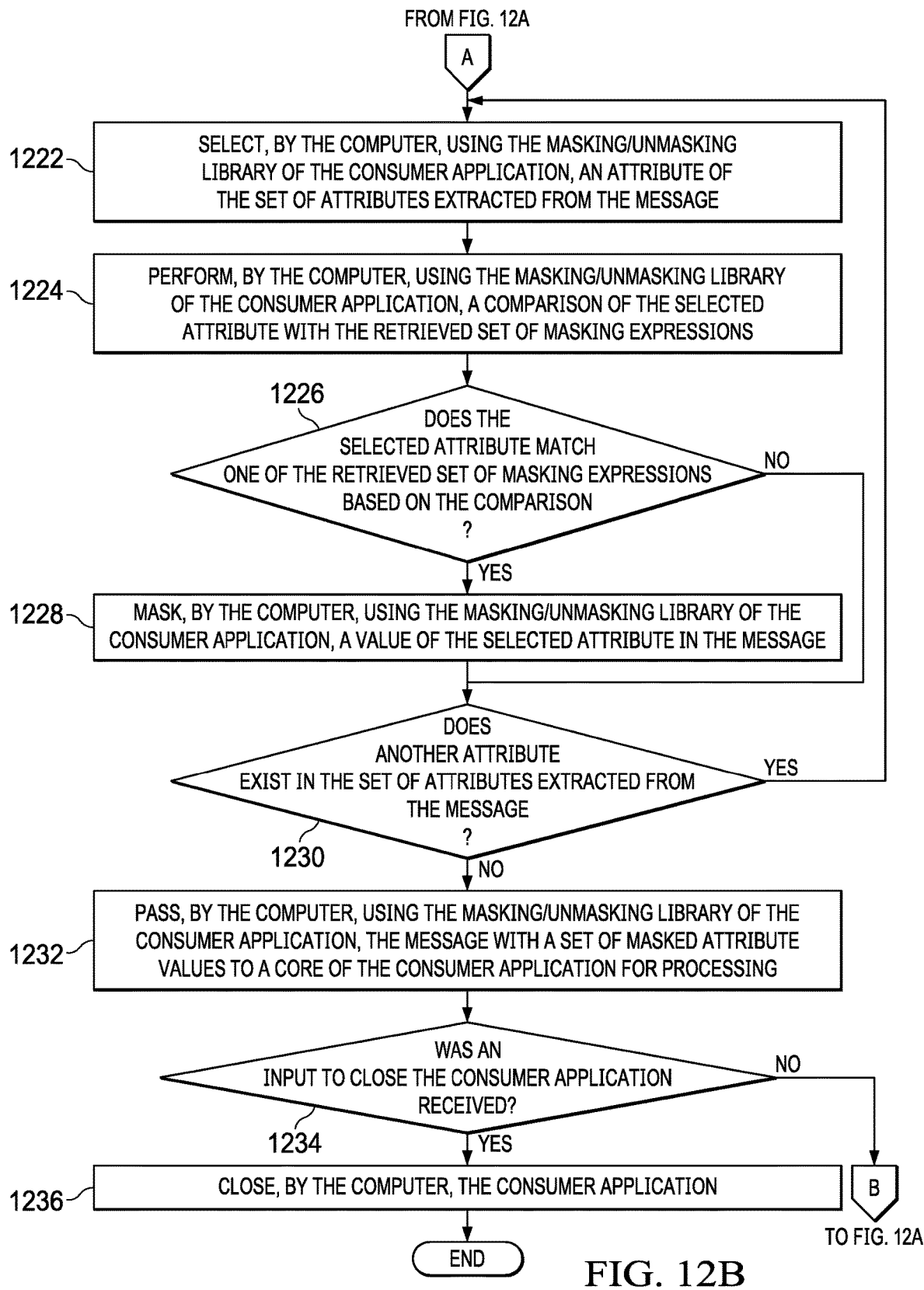

With reference now to FIGS. 12A-12B, a flowchart illustrating a process for masking values of attributes in messages using a cached schema registry is shown in accordance with an illustrative embodiment. The process shown in FIGS. 12A-12B may be implemented in a computer, such as, for example, client 110 in FIG. 1 or data processing system 200 in FIG. 2. For example, the process shown in FIGS. 12A-12B may be implemented in consumer application masking/unmasking library 226 in FIG. 2.

The process begins when the computer starts a consumer application that includes a masking/unmasking library and is registered to receive messages corresponding to a particular topic from an immutable datastore in response to receiving a start consumer application input (step 1202). In response to starting the consumer application, the computer sets use a cached schema of the masking/unmasking library to false (step 1204).

Subsequently, the computer, using the masking/unmasking library of the consumer application, receives a message corresponding to the particular topic that the consumer application is registered to receive from the immutable datastore (step 1206). The computer, using the masking/unmasking library of the consumer application, retrieves an identifier of a schema within a schema registry from a header of the message (step 1208). In addition, the computer, using the masking/unmasking library of the consumer application, makes a determination as to whether use the cached schema of the masking/unmasking library is set to false (step 1210).

If the computer, using the masking/unmasking library of the consumer application, determines that use the cached schema of the masking/unmasking library is not set to false, no output of step 1210, then the computer, using the masking/unmasking library of the consumer application, retrieves a set of masking expressions from the cached schema of the masking/unmasking library (step 1212). Thereafter, the process proceeds to step 1220.

If the computer, using the masking/unmasking library of the consumer application, determines that use the cached schema of the masking/unmasking library is set to false, yes output of step 1210, then the computer, using the masking/unmasking library of the consumer application, retrieves a set of masking expressions from the schema within the schema registry based on the identifier of the schema retrieved from the header of the message (step 1214). The computer, using the masking/unmasking library of the consumer application, updates the cached schema of the masking/unmasking library with the retrieved set of masking expressions from the schema within the schema registry (step 1216). Further, the computer, sets use the cached schema of the masking/unmasking library that corresponds to the particular topic to true (step 1218). Furthermore, the computer, using the masking/unmasking library of the consumer application, deserializes the message to extract a set of attributes from the message (step 1220).

Afterward, the computer, using the masking/unmasking library of the consumer application, selects an attribute of the set of attributes extracted from the message (step 1222). The computer, using the masking/unmasking library of the consumer application, performs a comparison of the selected attribute with the retrieved set of masking expressions (step 1224). The computer makes a determination as to whether the selected attribute matches one of the retrieved set of masking expressions based on the comparison (step 1226).

If the computer determines that the selected attribute does not match one of the retrieved set of masking expressions based on the comparison, no output of step 1226, then the process proceeds to step 1230. If the computer determines that the selected attribute does match one of the retrieved set of masking expressions based on the comparison, yes output of step 1226, then the computer, using the masking/unmasking library of the consumer application, masks a value of the selected attribute in the message (step 1228).

Moreover, the computer, using the masking/unmasking library of the consumer application, makes a determination as to whether another attribute exists in the set of attributes extracted from the message (step 1230). If the computer, using the masking/unmasking library of the consumer application, determines that another attribute does exist in the set of attributes extracted from the message, yes output of step 1230, then the process returns to step 1222 where the computer, using the masking/unmasking library of the consumer application, selects another attribute in the set of attributes. If the computer, using the masking/unmasking library of the consumer application, determines that another attribute does not exist in the set of attributes extracted from the message, no output of step 1230, then the computer, using the masking/unmasking library of the consumer application, passes the message with a set of masked attribute values to a core of the consumer application for processing (step 1232).

The computer makes a determination as to whether an input to close the consumer application was received (step 1234). If the computer determines that an input to close the consumer application was not received, no output of step 1234, then the process returns to step 1206 where the computer waits to receive another message corresponding to the particular topic. If the computer determines that an input to close the consumer application was received, yes output of step 1234, then the computer closes the consumer application (step 1236). Thereafter, the process terminates.

Figure 13:
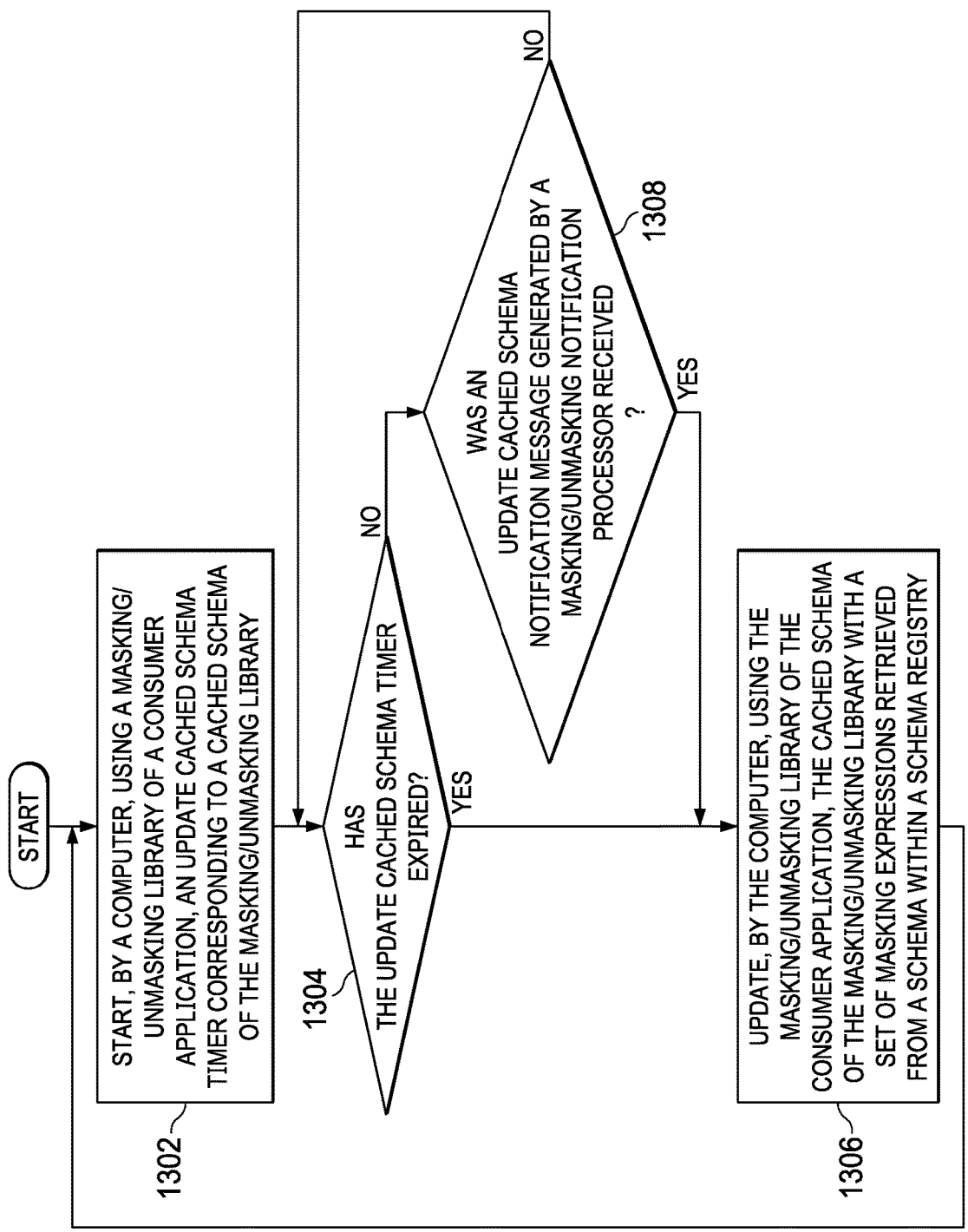
FIG. 13 is a flowchart illustrating a process for updating a cached schema registry in accordance with an illustrative embodiment.

With reference now to FIG. 13 is a flowchart illustrating a process for updating a cached schema registry is shown in accordance with an illustrative embodiment. The process shown in FIG. 13 may be implemented in a computer, such as, for example, client 110 in FIG. 1 or data processing system 200 in FIG. 2. For example, the process shown in FIG. 13 may be implemented in consumer application masking/unmasking library 226 in FIG. 2.

The process begins when the computer, using the masking/unmasking library of a consumer application, starts an update cached schema timer corresponding to a cached schema of the masking/unmasking library (step 1302). Subsequently, the computer, using the masking/unmasking library of a consumer application, makes a determination as to whether the update cached schema timer has expired (step 1304). If the computer, using the masking/unmasking library of a consumer application, determines that the update cached schema timer has expired, yes output of step 1304, then the computer, using the masking/unmasking library of the consumer application, updates the cached schema of the masking/unmasking library with a set of masking expressions retrieved from a schema within a schema registry (step 1306). Thereafter, the process returns to step 1302 where the computer, using the masking/unmasking library of a consumer application, starts the update cached schema timer once again.

Returning again to step 1304, if the computer, using the masking/unmasking library of a consumer application, determines that the update cached schema timer has not expired, no output of step 1304, then the computer, using the masking/unmasking library of a consumer application, makes a determination as to whether an update cached schema notification message generated by a masking/unmasking notification processor was received (step 1308). If the computer, using the masking/unmasking library of a consumer application, determines that an update cached schema notification message was not received, no output of step 1308, then the process returns to step 1304 where the computer, using the masking/unmasking library of a consumer application, determines whether the update cached schema timer has expired. If the computer, using the masking/unmasking library of a consumer application, determines that an update cached schema notification message generated by the masking/unmasking notification processor was received, yes output of step 1308, then the process returns to step 1306 where the computer, using the masking/unmasking library of a consumer application, updates the cached schema before expiration of the update cached schema timer.

Thus, illustrative embodiments of the present invention provide a computer-implemented method, computer system, and computer program product for selectively masking data in messages. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively masking data in messages, the computer-implemented method comprising:

retrieving, by a computer, a masking expression from a schema, the masking expression corresponds to a particular attribute within related messages generated by a producer application and sent to an immutable datastore for consumption by a consumer application of the computer that is registered to receive the messages related to a particular topic from the immutable datastore; and masking, by the computer, a particular attribute value only in those messages received from the immutable datastore that contain the particular attribute value during a time period when the particular attribute value is associated with the masking expression, wherein the particular attribute value, rather than an associated attribute key, is used to make a determination to perform the masking.

2. The computer-implemented method of claim 1 further comprising:
receiving, by the computer, using a masking/unmasking library of the consumer application, a message corresponding to the particular topic that the consumer application is registered to receive from the immutable datastore;
retrieving, by the computer, using the masking/unmasking library of the consumer application, an identifier of the schema from a header of the message; and
retrieving, by the computer, using the masking/unmasking library of the consumer application, a set of masking expressions from the schema based on the identifier of the schema retrieved from the header of the message.

3. The computer-implemented method of claim 2 further comprising:
deserializing, by the computer, using the masking/unmasking library of the consumer application, the message to extract a set of attributes from the message.

4. The computer-implemented method of claim 3 further comprising:
selecting, by the computer, using the masking/unmasking library of the consumer application, an attribute of the set of attributes extracted from the message;
performing, by the computer, using the masking/unmasking library of the consumer application, a comparison of the attribute with the set of masking expressions;
determining, by the computer, using the masking/unmasking library of the consumer application, whether the attribute matches one of the set of masking expressions based on the comparison; and
responsive to the computer determining, using the masking/unmasking library of the consumer application, that the attribute matches one of the set of masking expressions based on the comparison, masking, by the computer, using the masking/unmasking library of the consumer application, a value of the attribute in the message.

5. The computer-implemented method of claim 4 further comprising:
passing, by the computer, using the masking/unmasking library of the consumer application, the message with a set of masked attribute values to the consumer application for processing.

6. The computer-implemented method of claim 1 further comprising:
setting, by the computer, use a cached schema of a masking/unmasking library of the consumer application to false;
determining, by the computer, whether use the cached schema of the masking/unmasking library of the consumer application is set to false;
responsive to the computer determining that use the cached schema of the masking/unmasking library of the consumer application is set to false, retrieving, by the computer, a set of masking expressions from the schema using an identifier of the schema;
updating, by the computer, the cached schema of the masking/unmasking library of the consumer application with the set of masking expressions from the schema; and setting, by the computer, use the cached schema of the masking/unmasking library of the consumer application to true.

7. The computer-implemented method of claim 6 further comprising:
responsive to the computer determining that use the cached schema of the masking/unmasking library of the consumer application is not set to false, retrieving, by the computer, a set of masking expressions from the cached schema of the masking/unmasking library of the consumer application.

8. The computer-implemented method of claim 6 further comprising:
starting, by the computer, an update cached schema timer corresponding to the cached schema of the masking/unmasking library of the consumer application;
determining, by the computer, whether the update cached schema timer has expired; and
responsive to the computer determining that the update cached schema timer has expired, updating, by the computer, the cached schema of the masking/unmasking library of the consumer application with a set of masking expressions retrieved from the schema.

9. The computer-implemented method of claim 8 further comprising:
responsive to the computer determining that the update cached schema timer has not expired, determining, by the computer, whether an update cached schema notification message generated by a masking/unmasking notification processor was received; and
responsive to the computer determining that the update cached schema notification message generated by the masking/unmasking notification processor was received, updating, by the computer, the cached schema of the masking/unmasking library of the consumer application before expiration of the update cached schema timer.

10. The computer-implemented method of claim 1, wherein the masking expression is a selectively modifiable masking expression.

11. The computer-implemented method of claim 1, wherein the producer application and the consumer application agreed upon the schema that defines a format and attributes of the messages and enables a trust relationship between the producer application and the consumer application.

12. A computer system for selectively masking data in messages, the computer system comprising:
a bus system;
a storage device connected to the bus system, wherein the storage device stores program instructions; and
a processor connected to the bus system, wherein the processor executes the program instructions to:
retrieve a masking expression from a schema, the masking expression corresponds to a particular attribute within related messages generated by a producer application and sent to an immutable datastore for consumption by a consumer application of the computer system that is registered to receive the messages related to a particular topic from the immutable datastore; and
mask a particular attribute value only in those messages received from the immutable datastore that contain the particular attribute value during a time period when the particular attribute value is associated with the masking expression, wherein the particular attribute value, rather than an associated attribute key, is used to make a determination to perform the masking.

13. The computer system of claim 12, wherein the processor further executes the program instructions to:
- receive, using a masking/unmasking library of the consumer application, a message corresponding to the particular topic that the consumer application is registered to receive from the immutable datastore;
- retrieve, using the masking/unmasking library of the consumer application, an identifier of the schema from a header of the message; and
- retrieve, using the masking/unmasking library of the consumer application, a set of masking expressions from the schema based on the identifier of the schema retrieved from the header of the message.

14. The computer system of claim 13, wherein the processor further executes the program instructions to:
- deserialize, using the masking/unmasking library of the consumer application, the message to extract a set of attributes from the message.

15. The computer system of claim 14, wherein the processor further executes the program instructions to:
- select, using the masking/unmasking library of the consumer application, an attribute of the set of attributes extracted from the message;
- perform, using the masking/unmasking library of the consumer application, a comparison of the attribute with the set of masking expressions;
- determine, using the masking/unmasking library of the consumer application, whether the attribute matches one of the set of masking expressions based on the comparison; and
- mask, using the masking/unmasking library of the consumer application, a value of the attribute in the message in response to determining, using the masking/unmasking library of the consumer application, that the attribute matches one of the set of masking expressions based on the comparison.

16. A computer program product for selectively masking data in messages, the computer program product comprising a computer-readable storage medium having program instructions embodied therewith, the program instructions executable by a computer to cause the computer to perform a method of:
- retrieving, by the computer, a masking expression from a schema, the masking expression corresponds to a particular attribute within related messages generated by a producer application and sent to an immutable datastore for consumption by a consumer application of the computer that is registered to receive the messages related to a particular topic from the immutable datastore; and
- masking, by the computer, a particular attribute value only in those messages received from the immutable datastore that contain the particular attribute value during a time period when the particular attribute value is associated with the masking expression.

17. The computer program product of claim 16 further comprising:
- receiving, by the computer, using a masking/unmasking library of the consumer application, a message corresponding to the particular topic that the consumer application is registered to receive from the immutable datastore;
- retrieving, by the computer, using the masking/unmasking library of the consumer application, an identifier of the schema from a header of the message; and
- retrieving, by the computer, using the masking/unmasking library of the consumer application, a set of masking expressions from the schema based on the identifier of the schema retrieved from the header of the message.

18. The computer program product of claim 17 further comprising:
- deserializing, by the computer, using the masking/unmasking library of the consumer application, the message to extract a set of attributes from the message.

19. The computer program product of claim 18 further comprising:
- selecting, by the computer, using the masking/unmasking library of the consumer application, an attribute of the set of attributes extracted from the message;
- performing, by the computer, using the masking/unmasking library of the consumer application, a comparison of the attribute with the set of masking expressions;
- determining, by the computer, using the masking/unmasking library of the consumer application, whether the attribute matches one of the set of masking expressions based on the comparison; and
- responsive to the computer determining, using the masking/unmasking library of the consumer application, that the attribute matches one of the set of masking expressions based on the comparison, masking, by the computer, using the masking/unmasking library of the consumer application, a value of the attribute in the message.

* * * * *